United States Patent Office 3,286,502
Patented Nov. 22, 1966

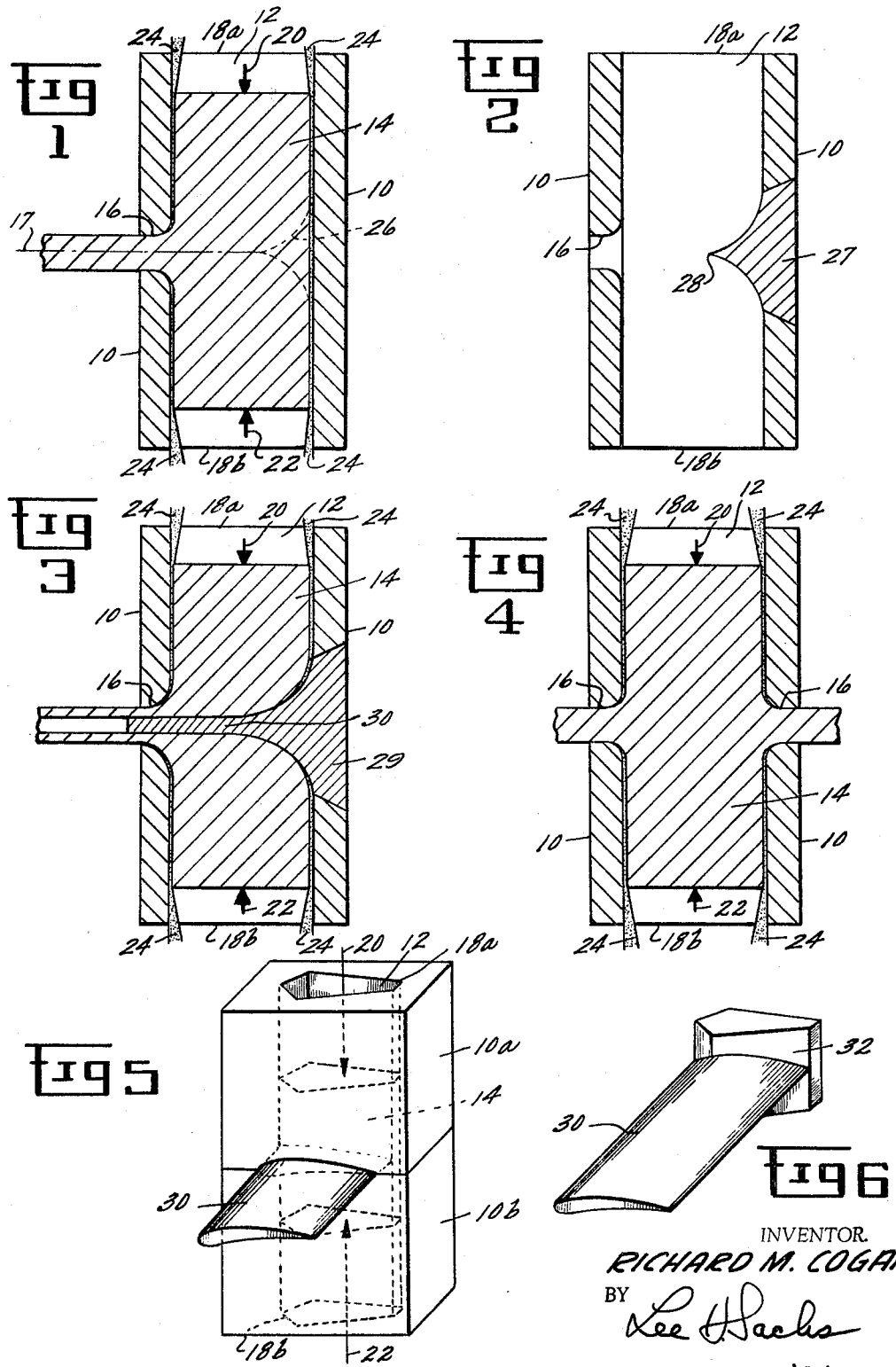

3,286,502
SIDE EXTRUSION
Richard Maurice Cogan, Hamilton, Mass., assignor to
General Electric Company, a corporation of New York
Filed Mar. 26, 1964, Ser. No. 354,894
7 Claims. (Cl. 72—259)

This invention relates to the extrusion of material and, more particularly to an improved apparatus, die and method for the extrusion of metallic materials.

Conventional extrusion dies for metals are generally appropriately shaped closed chambers with a desired orifice at one end through which a workpiece is extruded. Frequently the periphery of the orifice is strengthened to provide additional structural integrity. In the case of the extrusion of a circular metal rod from a larger circular billet, the die chamber was generally cylindrically shaped and closed at one end except for a circular orifice in the closed end through which the metal of the billet is extruded. In the practice of metal extrusion, it is generally necessary that a lubricant exist or be introduced along the walls of the die toward and particularly at the orifice in order to decrease friction between the shearing metal and the die during extrusion.

When it was recognized that the workpiece had a tendency to shear along lines defining a shape somewhat like a funnel emanating from the orifice, the construction of the die was changed to provide a funnel-like entry to the orifice in the die chamber. This allowed more lubricant to flow along with the metal to the points of shear, particularly at the orifice.

In known metal extrusion methods using known types of dies, the direction of the force applied to the billet is substantially parallel to and generally concentric with the axis through the orifice. Thus the grain or physical metal orientation in the extruded member, even on repeated extrusions, is substantially in the same direction as in the workpiece material. In addition, there still was difficulty in providing sufficient lubricant to the edges of the orifice where a substantial amount of work was being done on the workpiece material.

Furthermore, because of the necessary change to a funnel shaped entry at the orifice, it was not possible to extrude certain articles, such as airfoil sections for blading members of gas turbines including a projection substantially perpendicular to a platform or base section at a narrow fillet transition portion.

A principal object of the present invention is to provide an improved extrusion die and method wherein an improved lubrication path is provided to a die orifice which allows the extruded portion to extend at an angle to the workpiece material other than in the direction of applied extruding force.

Another object is to provide an extrusion die from which can be extruded a member having a grain or physical metal orientation different from that of the workpiece billet from which the member was extruded.

Another object is to provide an extrusion die and apparatus through the use of which a workpiece billet can be worked without change in size or shape in order to remove directionality in the microstructure.

These and other objects and advantages will be more clearly understood from the following detailed descriptions and drawings in which:

FIGS. 1 and 2 are sectional partially schematic representations of two preferred forms of the die of the present invention for the extrusion of a solid member;

FIG. 3 is a sectional partially schematic view of another preferred form of the die of the present invention for the extrusion of a hollow member;

FIG. 4 is a sectional partially schematic representation of another preferred form of the die of the present invention for extruding a plurality of projections from the same ingot;

FIG. 5 is an isometric partially schematic view of a die of the present invention particularly adapted to the extrusion of airfoil sections from a uniquely shaped ingot; and FIG. 6 is a blading member blank extruded from the die of FIG. 5.

Briefly, the extrusion apparatus of the present invention comprises an extrusion die and means to apply an extrusion force to a workpiece in the die through an open end portion. The die includes an extrusion orifice in a side wall rather than in an end portion, the orifice directing the extruded material at an angle rather than parallel to the applied extrusion force. This provides an improved lubrication path and a different structure to the workpiece at and after extrusion. In its preferred form, die includes two open end portions so that the apparatus can include means to direct through the end portions two balanced extrusion forces, equal in magnitude and opposite in direction.

One form of the method of the present invention includes the step of applying to a workpiece an extrusion force of sufficient magnitude to plastically deform the workpiece material through an extrusion die in a direction other than parallel to the direction in which the extrusion force is applied to the workpiece.

Referring to the drawing, FIG. 1 shows a simplified version of the preferred form of the extrusion die and apparatus of the present invention in operation. The die has walls 10 defining a workpiece receptacle 12 into which workpiece 14 is introduced. The die includes an orifice 16 in a wall 10 and intermediate the end portions 18a and 18b both of which are open. After the workpiece 14 has been placed within the workpiece receptacle 12, forces 20 and 22 which are equal in magnitude and opposite in direction and of a total magnitude sufficient to plastically deform the material of the workpiece are applied through open end portions 18a and 18b, respectively, to the workpiece to extrude the workpiece material through orifice 16. The axis or center line 17 through orifice 16 is other than parallel to the direction at which forces 20 and 22 are applied to the workpiece.

In normal metal extrusion practice, a lubricant, such as powdered glass, molybdenum disulfide colloidal graphite or the like, is applied to a heated workpiece-billet prior to its being placed in the die. However, lubricant can be added to the billet in the die because the fit between the die and billet is not a close one. Thus lubricant can be introduced into the clearance space between the die walls and the workpiece-billet. In the drawing, the introduction or presence of lubricant along the billet walls is shown schematically by a means at 24 to show passage of lubricant along the receptacle walls to lubricate the workpiece material extruded through orifice 16. Through the use of the die of the present invention, the lubricant has a short, direct path to the orifice uninterrupted by portions of the workpiece in the process of extrusion.

One advantage of the practice of the present invention is that the type of grain structural or physical microstructural arrangement of the material extruded through orifice 16 is different from that of the workpiece. This change occurs because the direction of extrusion is other than parallel and preferably substantially normal to the major axis of orientation through the workpiece material or substantially normal to a line along which the forces 20 and 22 are applied. Thus a workpiece having a cast structure can be extruded and hot or cold worked into a member having a forged type structure through the use of the present invention.

Because practice of the present invention allows the workpiece material to be worked, either hot or cold depending on the mechanical properties or physical structure desired, in addition to being extruded, it is now possible to work-extrude a material without substantially changing its size or shape. This can be accomplished by constructing the extrusion die of the present invention such that the shape and size of a cross-section through receptacle 12 is the same as the shape and size of a cross-section through orifice 16. In a simplified form, this would mean that a circular cast workpiece bar of about ½" diameter would be placed within the workpiece receptacle 12 of the die of FIG. 1 having a circular orifice 16 of ½" diameter. With the application of appropriate forces 20 and 22, the workpiece can be extruded into a ½" bar having a forged type structure.

During extrusion of the workpiece 14 shown in FIG. 1, the material of the workpiece flows toward orifice 16 and tends to slip along dotted lines 26 which enclose a "dead space." If it is desirable to eliminate such a dead space from the workpiece to be extruded, the die can be constructed with a removable plug 27 as shown in FIG. 2 including an approximately shaped projection 28 to mate with a cavity in the workpiece.

The practice of the present invention can greatly improve the manufacture of hollow extruded members such as hollow tubing. In a conventional extrusion of tubes, generally a hole is first bored lengthwise through the billet. The extruding punch includes a member which extends through the bored hole in the billet and the die orifice with a clearance space on either side between the member and the orifice walls equal to the wall thickness desired in the tube. As the punch forces the billet material through the orifice, the punch member which extends through the hole bored in the billet bears along its full length on the walls of the hole in the billet as well as on the extruded tube thus creating an additional friction. This means that more force is required to extrude the workpiece material through the orifice. The full length of the punch member bearing initially only on the billet hole, continues to bear on the tube as the punch and tube are forced through the die orifice. Through the use of a multiple portion die including a removable plug 29 constructed as shown in FIG. 3, a hole which was formerly required to be bored lengthwise in a workpiece now only need be bored through the narrower width of a workpiece. Furthermore, because projection 30 of plug 29 in FIG. 3 bears on the workpiece and extruded tubing only to the point where the tube leaves orifice 16, significantly less force to overcome friction is required compared with normal practice. Therefore, the extrusion of hollow shaped members, for example, in the shape of tubes, hollow rectangular members, complex shapes and the like, can be accomplished with less force than has heretofore been required.

In addition, it should be understood that the practice of the present invention can be applied to the extrusion of a plurality of members from the same workpiece billet as shown in FIG. 4 and in the following Example 2.

Another advantage of the present invention resides in the fact that a billet can be cast in a shape which relates to the shape of the member to be extruded so that the percentage reduction from each incremental portion of the billet to its corresponding portion in the extruded part is substantially the same. FIG. 5, shows the use of the present invention as split die portions 10a and 10b in the extrusion of an airfoil section from a workpiece, the unextruded portion of which remains as a base workpiece portion. The dimensional relationship which can exist between the shape of the workpiece and the shape of extruded airfoil can be seen. Taking the blade airfoil as an example, the extrusion from a rectangular billet of the airfoil, which can be represented generally by a trapezoid, takes a great deal more work and greater reduction of material at the airfoil leading and trailing edges than it does to extrude the heaviest part of the airfoil. Therefore normal extrusion tends to wear more rapidly at such high reduction areas. However, casting or otherwise working a billet prior to extrusion, into substantially a trapezoidal shaped workpiece 14 shown in FIG. 5, which shape is generally related to the airfoil shape to be extruded at each increment of its cross-section, the amount of work needed to extrude the airfoil from the billet is greatly reduced. FIG. 6 shows the extruded airfoil 30 attached to a base workpiece 32 which can be further worked such as by machining, grinding, forging and the like into a desired base shape.

The extrusion of an accurately dimensioned airfoil section is made possible through the practice of the present invention because of the excellent lubrication provided at the orifice. The lubricant passes continually to the orifice because the metal continues to pull the lubricant as it is moved toward and through the orifice. One feature and significant advantage of the preferred form of the present invention is that the forces 20 and 22 are easily applied using conventional equipment and simple dies to the opposite sides of the workpiece billet as shown in the drawing. Although the use of special lubricant feed means to supply lubricant to a side of the orifice on a closed end is contemplated in the broad scope of the invention, a single force applied from one side, reacting against a closed end, tends to bring the lubricant starvation at the orifice on the closed end side where the reaction force would occur. Thus complicated apparatus would be required to prevent the orifice from being wiped clean on that one side thus resulting in imperfect extrusion.

EXAMPLE 1

A solid 1" diameter cylindrical cast bar of a material nominally consisting, by weight of 0.1% C, 1% Mn, 4.2% Ni, 2.3% Mo, 15% Cr, balance Fe and incidental impurities, was placed in a die as shown in FIG. 1. The die had an orifice shape generally as an airfoil section with a ⅞" chord length. Immediately prior to introduction into this die, the billet was heated to a temperature of about 1600° F. and rolled in a glass lubricant so that the glass adhered to the billet walls. Forces 20 and 22 were applied from a seventy-five ton mechanical press operating at about 120 strokes per minute. In about a two second operation, an airfoil section of 2" in length was extruded through orifice 16. Lathe lines on the extruded airfoil section indicated the excellent lubrication at the orifice using conventional type lubricants. In additional runs, various other airfoil lengths were obtained.

EXAMPLE 2

A solid rectangular ¾" x ½" billet of 2S type aluminum was placed in a die of the type shown in FIG. 4 and having two circular orifices each of ¼" diameter. A vinyl base lubricant, one form of which is known commercially as "Lubri-Cool," was applied to the billet at room temperature. The press of Example 1 was used with the billet at room temperature to extrude two cylindrical members ¼" in diameter and about 1½" long. Additional runs on similar billets produces various lengths in the cylindrical extruded members.

Although the present invention has been described in connection with specific examples it will be understood by those skilled in the metallurgical and metal working arts, the variations and modifications of which the present invention is capable.

What is claimed is:
1. In a method of extruding from a workpiece billet through an extrusion orifice an article having a cross-sectional shape other than circular normal to the axis of extrusion, the steps of:

shaping the workpiece billet to provide the billet with end portions and wall portions extending lengthwise between the end portions, each cross-sectional dimension of the billet through the wall portions normal to the length between the end portions of the billet being shaped to correspond generally with each common cross-section through the extrusion orifice so that the generally larger cross-sections through the billet corresponds in general position with the larger cross-sections through the extrusion orifice;

positioning the billet in an extrusion die having a billet receptacle shaped to correspond with the shape of the billet so that a wall portion intermediate the end portions is positioned opposite an extrusion orifice in a wall of the extrusion die and each cross-sectional dimension of the workpiece billet normal to the workpiece billet length is in alignment with each common cross-section through the extrusion orifice so that the generally larger cross-sections through the workpiece billet are in general alignment with the larger cross-sections through the extrusion orifice; and then extruding the article through the extrusion orifice from a wall portion of the billet at a point intermediate the end portions.

2. In a method of extruding from a cast workpiece billet through an extrusion orifice an article having a forged structure and a cross-sectional shape other than circular normal to the axis of extrusion, the steps of:

casting the workpiece billet to provide the billet with end portions and wall portions extending lengthwise between the end portions, each cross-sectional dimension of the billet through the wall portions normal to the length between the end portions of the billet being shaped to correspond generally with each common cross-section through the extrusion orifice so that the generally larger cross-sections through the billet correspond in general position with the larger cross-sections through the extrusion orifice;

positioning the billet in an extrusion die having a billet receptacle shaped to correspond with the shape of the billet so that a wall portion intermediate the end portions is positioned opposite an extrusion orifice in a wall of the extrusion die and each cross-sectional dimension of the workpiece billet normal to the workpiece billet length is in alignment with each common cross-section through the extrusion orifice so that the generally larger cross-sections through the workpiece billet are in general alignment with the larger cross-sections through the extrusion orifice; and then extruding the article through the extrusion orifice from a wall portion of the billet at a point intermediate the end portions.

3. In a method of extruding an airfoil from a workpiece billet through an airfoil shaped extrusion orifice, the steps of:

shaping the workpiece billet to provide the billet with end portions and wall portions extending lengthwise between the end portions, each cross-sectional dimension of the billet through the wall portions normal to the length between the end portions of the billet being shaped to correspond generally with each common cross-section through the airfoil shaped extrusion orifice so that the generally larger cross-section through the billet correspond in general position with the larger cross-sections through the airfoil shaped extrusion orifice;

positioning the billet in an extrusion die having a billet receptacle shaped to correspond with the shape of the billet so that a wall portion intermediate the end portions is positioned opposite an extrusion orifice in a wall of the extrusion die and each cross-sectional dimension of the workpiece billet normal to the workpiece billet length is in alignment with each common cross-section through the airfoil shaped extrusion orifice so that the generally larger cross-sections through the workpiece billet are in general alignment with the larger cross-sections through the airfoil shaped extrusion orifice; and then extruding the airfoil through the airfoil-shaped extrusion orifice from a wall portion of the billet at a point intermediate the end portions.

4. In a method of extruding an airfoil having a forged structure from a cast workpiece billet through an airfoil shaped extrusion orifice, the steps of:

casting the workpiece billet to provide the billet with end portions and wall portions extending between the end portions, each cross-sectional dimension of the billet through the wall portions normal to the axial length between the end portions of the billet being shaped to correspond generally with each common cross-section through the airfoil shaped extrusion orifice so that the generally larger cross-sections through the billet correspond in general position with the larger cross-sections through the airfoil shaped extrusion orifice;

positioning the billet in an extrusion die having a billet receptacle shaped to correspond with the shape of the billet so that a wall portion intermediate the end portions is positioned opposite an extrusion orifice in a wall of the extrusion die and each cross-sectional dimension of the workpiece billet normal to the workpiece billet length is in alignment with each common cross-section through the airfoil shaped extrusion orifice so that the generally larger cross-sections through the workpiece billet are in general alignment with the larger cross-sections through the airfoil shaped extrusion orifice; and then extruding the airfoil through the airfoil-shaped extrusion orifice from a wall portion of the billet at a point intermediate the end portions to form a forged structure in the airfoil.

5. An extrusion die for receiving a workpiece, comprising:

end portions, at least one of which is open;

side walls extending between the end portions, the side walls and the end portions defining a workpiece receptacle disposed lengthwise between the end portions; and an extrusion orifice of a shape other than circular in a side wall intermediate the end portions and communicating with the workpiece receptacle;

each cross-sectional dimension of the workpiece receptacle normal to the receptacle length being in alignment with each common cross-section through the extrusion orifice so that the generally larger cross-sections through the workpiece receptacle are in general alignment with the larger cross-sections through the extrusion orifice.

6. A die as described in claim 5, but which, in addition, is divided into separate but mating die portions along the cross-section normal to the length of the workpiece receptacle and through the extrusion orifice.

7. An extrusion die for receiving a workpiece to produce an airfoil, comprising:

end portions, at least one of which is open;

side walls extending between the end portions, the side walls and the end portions defining an axially disposed workpiece receptacle disposed length-wise between the end portions; and an airfoil shaped extrusion orifice in a side wall intermediate the end portions and communicating with the workpiece receptacle;

each cross-sectional dimension of the workpiece receptacle normal to the receptacle length being in alignment with each common cross-section through the airfoil shaped extrusion orifice so that the generally larger cross-sections through the workpiece receptacle are in general alignment with the larger cross-sections through the extrusion orifice.

References Cited by the Examiner

UNITED STATES PATENTS

| | | | |
|---|---|---|---|
| Re. 13,562 | 5/1913 | Summey | 72—259 |
| 338,561 | 3/1886 | Shaw | 72—259 |
| 2,389,876 | 11/1945 | Sequin | 72—260 |
| 2,753,995 | 7/1956 | Tennant et al. | 72—259 |
| 2,759,599 | 8/1956 | Billen | 72—259 |
| 2,782,921 | 2/1957 | Norman | 72—259 |
| 3,158,262 | 11/1964 | Scribner | 72—259 |

FOREIGN PATENTS 399,897  7/1924  Germany.

CHARLES W. LANHAM, *Primary Examiner.*

D. E. O'CONNOR, H. D. HOINKES,
    *Assistant Examiners.*